United States Patent [19]
Smith et al.

[11] Patent Number: 5,720,554
[45] Date of Patent: Feb. 24, 1998

[54] APPARATUS AND METHOD FOR THE CALIBRATION OF THERMAL PAINT

[75] Inventors: Michael Kelvin Douglas Smith; David Granger Marriott, both of Lincoln, United Kingdom

[73] Assignee: European Gas Turbines Limited, United Kingdom

[21] Appl. No.: 553,892

[22] Filed: Nov. 6, 1995

[30] Foreign Application Priority Data

Nov. 18, 1994 [GB] United Kingdom ............ 9423305

[51] Int. Cl.⁶ .................................................. G01K 15/00
[52] U.S. Cl. ............................................. 374/1; 374/15
[58] Field of Search .................................. 374/1, 15, 162

[56] References Cited

U.S. PATENT DOCUMENTS

| | | | |
|---|---|---|---|
| 2,691,885 | 10/1954 | Farnham, Jr. ................ | 374/15 |
| 2,730,892 | 1/1956 | Bruce et al. ................... | 374/15 |
| 3,801,467 | 4/1974 | Nobe et al. .................... | 374/15 |
| 4,137,966 | 2/1979 | Ulrich et al. ................... | 374/15 |

FOREIGN PATENT DOCUMENTS

| | | | |
|---|---|---|---|
| 5093655 | 8/1993 | Japan. | |
| 0505910 | 3/1976 | U.S.S.R. ............... | 374/1 |
| 908236 | 10/1962 | United Kingdom. | |

OTHER PUBLICATIONS

Messen & prufen, No. 9, Sep. 1981, Bad Worishofen De. pp. 574–577, Franz Braun, *Messung Von Oberflachentemperaturen Mit Farbindikatoren An Bewegten Korpern*.

*Primary Examiner*—Diego F. F. Gutierrez
*Attorney, Agent, or Firm*—Kirschstein, et al.

[57] ABSTRACT

A method and apparatus for calibrating the temperature/color correspondence of thermal paint. A strip of metal is heated at both ends independently to achieve a predetermined temperature differential measured by thermocouples. Heat flow from the hot end to the cooler end is constrained to the test piece by enclosing it in insulation material. A linear temperature gradient is thus achieved so providing a more accurate and flexible calibrating arrangement.

7 Claims, 1 Drawing Sheet

APPARATUS AND METHOD FOR THE CALIBRATION OF THERMAL PAINT

BACKGROUND OF THE INVENTION

This invention relates to the calibration of thermal paints, that is, temperature-indicating paints which progressively change colour with temperature increase and which are commonly used to ascertain the working temperature of components otherwise difficult to monitor. The change in paint colour is not reversed on cooling so that a record of the temperature reached is effectively achieved. A typical application for such paint might be for those components in a gas turbine engine subject to the hot gas flow.

Such paints may vary in performance from one manufacturer to another and between batches from the same manufacturer. Where accurate results are important it is necessary to test each batch for temperature to colour relationship and it is this aspect which is the subject of the invention.

One method of calibrating paint colour is described in British Standard 1041. Briefly, this is an electrical resistance method where a test piece of the material is painted and an electrical heating current passed through it. The piece is of tapered section so the temperature (measured by thermocouples) is highest at its narrowest point and lowest at its widest point. A temperature gradient is thus created along which the changing colours can be observed and plotted against corresponding temperature change.

Methods such as this suffer at least from the disadvantage that different shaped test pieces are required for different temperature gradient ranges.

A further prior art method is to take a test piece and bring to a selected temperature in an oven for a prescribed time before removal. This process is then repeated for a number of test pieces with different heating times to cover the temperature range required. Obviously for a range of temperatures this is a time consuming and expensive method.

SUMMARY OF THE INVENTION

According to one aspect of the invention, temperature control apparatus comprises a heat conducting test piece having a heat flow axis extending between two heat sources, first and second temperature-sensing means disposed in temperature-sensing relationship to said test piece at points between a centre-point of said test piece and said first and second heat sources, respectively, and a control means connected to said temperature-sensing means and to said heat sources, said control means being arranged to control the respective heat sources to establish a predetermined temperature gradient along the heat flow axis between the temperature-sensing means.

The test piece may be of uniform cross-section, and it may be enclosed in insulation material between the temperature-sensing locations. The insulation material may be relieved around the test piece between the temperature-sensing means in a region intended for the application of a coating of thermally responsive paint.

Each end of the test piece preferably extends through a wall of a respective chimney section and terminates in the chimney section, the heat sources being contained within the respective chimney sections beneath the respective test piece ends.

The test piece may be a rigid strip of metal, the chimney sections being of rectangular section joined by a rectangular housing which encloses the insulation material, at least one chimney section having an aperture in its wall opposite to the other chimney section to permit the insertion of the test piece into its operative position.

The heat sources may be gas times.

According to another aspect of the invention, in a thermal paint calibration apparatus comprising a temperature control apparatus as aforesaid, the test piece is coated with thermally responsive paint in a region between said points of location of said temperature-sensing means, and said control means is arranged to control said heat sources to maintain temperatures at the temperature-sensing locations such that temperatures within said paint-coated region include the range of temperatures to which said thermally responsive paint is responsive.

According to a further aspect of the invention, there is provided a method of calibrating thermally responsive paint, in which a longitudinal test piece is coated over a central region thereof with a thermally responsive paint adapted to assume a range of colours progressively and irreversibly with increase of temperature throughout a predetermined temperature range, and the test piece is heated at both ends differentially to provide a temperature gradient over an intermediate region, at each end of which region is a temperature sensor controlling the associated heat source.

BRIEF DESCRIPTION OF THE DRAWINGS

Apparatus and a method for the calibration of thermal paint will now be described, by way of example, with reference to the accompany drawings, of which.

DETAILED DESCRIPTION OF AN EMBODIMENT OF THE INVENTION

Figure 1:
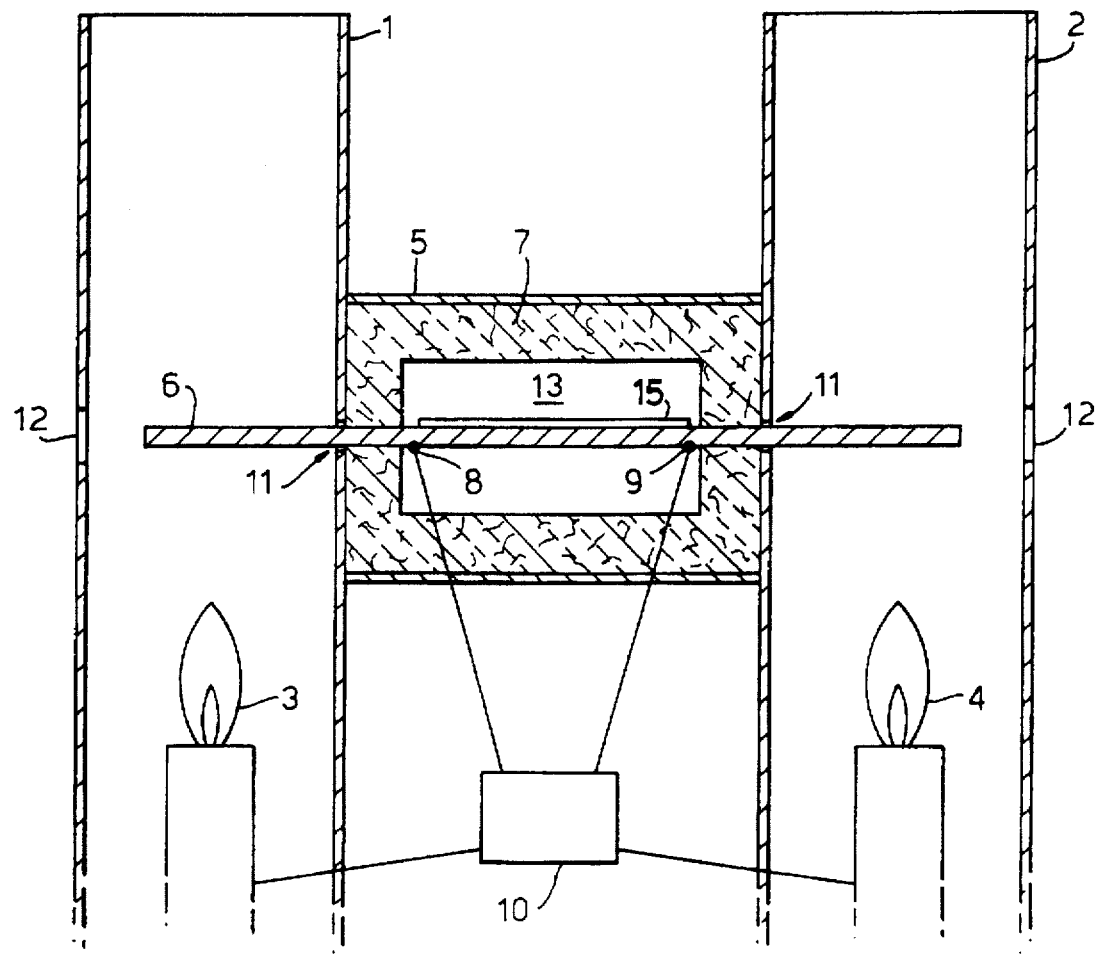
FIG. 1 is a diagrammatic cross-section of the paint calibration apparatus.
Figure 2:
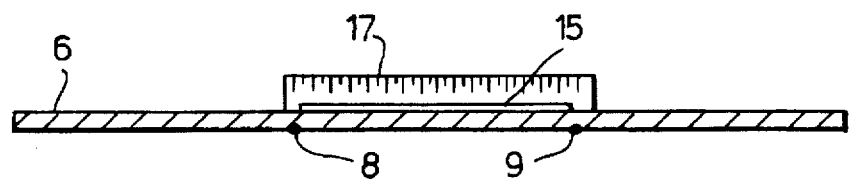
FIG. 2 is a diagram showing the use of a temperature scale to complete the calibration of the thermal paint.

A test piece 6 is a metal strip conveniently 5 millimeters thick, 15 millimeters wide (dimension not shown) and 100 millimeters long. The strip is supported between two chimney sections 1 and 2 which are rectangular in section and joined by a housing 5 also of rectangular section. The inner walls of the chimneys have apertures 11 through which the test piece protrudes into the chimneys 1 and 2. The opposite face of each chimney also has an aperture 12 through which the test piece can be inserted.

In each chimney is a heat source 3 or 4 which is a controlled gas burner, the control means being indicated at 10. The burners are mounted underneath the test piece end and heat it by convection and radiation.

By controlling the burners differentially, a temperature difference is imposed between the thermocouples 8 and 9 by causing heat to travel from (say) the left hand end of the test piece to the fight hand end. If no heat is lost transversely from the test piece and the cross-section is constant, there will he a linear temperature gradient between the thermocouples.

Monitoring of the test piece temperature is achieved by two thermocouples 8 and 9 positioned at each end of a test region and just within the housing 5. The housing 5 is lined on all faces with a thick wall of insulation material which is relieved in the central test region so as to permit room for the passage of a gas if required.

A completely linear temperature gradient along the heat flow axis requires zero heat loss from the sides and edges of the test piece in the test region so that all heat input at the 'hot end' emerges at the 'cool end'. It also requires a constant cross-section of the test piece along the heat flow axis. A degree of transverse heat loss could be compensated by a corresponding decreasing gradation of cross-section.

The ideal arrangement for zero heat loss is therefore one in which the insulation 7 is in contact with the test piece 6 over the whole of the test region. A cavity 13 and a thick wall of insulation 7 is, however, a close approximation to the ideal arrangement.

In operation a coating of thermal paint 15 is applied to the test piece, on one or both surface,thereof over the central region between the thermocouples. The burners are then turned up under the control of their respective thermocouples until the temperatures have stabilised for a predetermined period. The heat is then removed, and a linear temperature scale 17 is fixed to the test piece in alignment with the reference temperatures at 8 and 9 so providing a range of colours and their corresponding temperatures.

The apparatus may be used to calibrate paints for use on gas turbines where the component in question may reach a temperature of 1200° C. The calibration apparatus must therefore be capable of achieving a temperature gradient extending up to this temperature and down to, say, 600° C. Selected smaller ranges may also be imposed on paints capable of finer discrimination, e.g. where a colour change occurs with a temperature change of, say, 20° C. The controlled temperatures required at 8 and 9 are entered into the control means 10 which in turn controls the burners 3 and 4 to achieve these temperatures.

It is found that the material of the test piece can in some cases affect the paint colouration. The material, eg, Nimonic 75, may therefore be chosen to simulate the material of the turbine component.

Again, the paint colour may be affected by the working gas (exhausted combustion products) in the turbine. This factor may be taken into account by heating the test piece in the presence of exhaust gases pumped slowly through the cavity 13.

The attached illustration is only diagrammatic and it will be clear that the thermocouples cannot be attached as shown prior to insertion of the test piece. An end wall of the housing 5 may be removable together with its insulation wall to provide access once the test piece is inserted.

The advantages of the embodiment described are as follows:

1. Greater accuracy. Test piece material, paint and thermocouples are at same temperature so there is less cause for error and also the linear temperature profile is perpendicular to heat flow.
2. Just one test piece required for a range of temperature.
3. A relatively quick and cheap method.
4. With minor alterations to the rig it is possible to surround the test piece with a gas environment similar to that which the actual component will experience in operation. If for some reason the paint is affected differently by such gas as opposed to normal air environment, this cause for error can thus be eliminated.

We claim:

1. A thermal paint calibration apparatus, comprising:
   a) a heat-conducting test piece of substantially uniform cross-section and having a heat flow axis extending between first and second heat sources;
   b) first and second temperature-sensing means disposed in a temperature-sensing relationship to said test piece at either side of a longitudinal region thereof between said first and second heat sources, respectively;
   c) a coating of a thermally responsive paint applied to said test piece in said longitudinal region;
   d) a control means connected to said temperature-sensing means and to said heat sources, said control means being operative for controlling the respective heat sources to establish a predetermined temperature gradient along the heat flow axis between the first and second temperature-sensing means, said gradient including a range of temperatures to which said thermally responsive paint is responsive; and
   e) an insulating casing surrounding said test piece between the first and second temperature-sensing means, said casing being in spaced relationship to said test piece in said longitudinal region.

2. The apparatus according to claim 1, in which said test piece has ends, each extending through a wall of a respective chimney section and terminating in the respective chimney section, said heat sources being contained within the respective chimney sections beneath the respective ends of the test piece.

3. The apparatus according to claim 2, in which said test piece is a rigid strip of metal and said chimney sections are joined by a housing which encloses said insulating casing, at least one of said chimney sections having an aperture in its wall facing away from the other chimney section to permit the insertion of the test piece into its operative position.

4. The apparatus according to claim 3, in which said heat sources are gas flames.

5. The apparatus according to claim 1; and further comprising a substantially linear temperature scale for affixing to said longitudinal region of said test piece following the establishing of said temperature gradient along said heat flow axis.

6. A method of calibrating thermally responsive paint, comprising the steps of:
   a) coating a heat-conducting test piece of substantially uniform cross-section over a longitudinal region thereof with a thermally responsive paint adapted to assume a range of colors progressively and irreversibly with an increase of temperature throughout a predetermined temperature range;
   b) differentially heating the test piece at either side of said longitudinal region thereof while limiting a transverse flow of heat away from said test piece by surrounding said longitudinal region with insulation spaced from said longitudinal region;
   c) monitoring a temperature of said test piece at each of two points therealong;
   d) controlling said differential heating consequent to said monitoring step to provide a desired temperature gradient over said longitudinal region between said two points, said gradient including said predetermined temperature range;
   e) terminating at least said heating and controlling steps when said desired temperature gradient has been established; and
   f) affixing a substantially linear temperature scale to said longitudinal region, and aligning said scale at two outer points thereof to said two points of said test piece.

7. The method according to claim 6; and further comprising the step of introducing during the heating step a gaseous fluid into a gap between the longitudinal region of said test piece and said insulation.

* * * * *